(12) United States Patent
Kondo

(10) Patent No.: US 6,806,597 B2
(45) Date of Patent: Oct. 19, 2004

(54) LEAD SCREW TYPE STEPPING MOTOR

(75) Inventor: Yasushi Kondo, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/459,515

(22) Filed: Jun. 12, 2003

(65) Prior Publication Data
US 2004/0036364 A1 Feb. 26, 2004

(30) Foreign Application Priority Data
Aug. 22, 2002 (JP) ........................................ 2002-241673

(51) Int. Cl.$^7$ ............................................... H02K 7/06
(52) U.S. Cl. ......................... 310/49 R; 310/80; 310/12; 310/20
(58) Field of Search ......................... 310/49 R, 12–15, 310/20, 36–37, 80

(56) References Cited

U.S. PATENT DOCUMENTS

| | | | | |
|---|---|---|---|---|
| 5,085,401 A | * | 2/1992 | Botting et al. | 251/129.11 |
| 5,811,901 A | * | 9/1998 | Nagai et al. | 310/80 |
| 6,049,151 A | * | 4/2000 | Suzuki et al. | 310/80 |
| 6,603,228 B1 | * | 8/2003 | Sato | 310/83 |
| 2002/0043880 A1 | * | 4/2002 | Suzuki et al. | 310/12 |
| 2002/0050751 A1 | * | 5/2002 | Hashimoto et al. | 310/71 |
| 2003/0052550 A1 | * | 3/2003 | Hayashida et al. | 310/12 |

* cited by examiner

*Primary Examiner*—Thanh Lam
(74) *Attorney, Agent, or Firm*—Rabin & Berdo, P.C.

(57) ABSTRACT

To provides a lead screw type stepping motor which is excellent in a response and controllability and can carry out an accurate initial alignment, a rotor (2) is rotatably supported inside of a stator (1) around which an exciting coil (1A) is wound, a female threaded hole (2A) is provided in the center of the rotor (2), a slider (6) is arranged to be engaged with the female threaded hole (2A), a slit groove (6C) shaped in an oblong hole is pierced through in the slider (6), which is movably arranged in a guide hole (3B) of a case (3), a guide pin (7) is arranged to be inserted into the slit groove (6C), and both ends of the guide pin (7) are press inserted and fixed to a bearing portion (3A) in which the guide hole (3B) is provided.

1 Claim, 2 Drawing Sheets

LEAD SCREW TYPE STEPPING MOTOR

BACKGROUND OF THE INVENTION

1. Field of the Invention

The present invention relates to a stepping motor structured by a rotor constituted by a permanent magnet and a stator around which an exciting coil is wound, and more particularly to a lead screw type stepping motor in which a rotation of the rotor is converted into a linear movement by a slider to output toward an outer portion.

2. Description of Conventional Art

A conventional lead screw type stepping motor is shown in FIGS. 2 and 3. FIG. 2 is a vertical cross sectional side view, and FIG. 3 is a vertical cross sectional side view in a line X—X in FIG. 2. Reference numeral 10 denotes a stator around which an exciting coil 11 is wound. A rotor 13 provided with a permanent magnet 12 is arranged inside of the stator 10. The rotor 12 is rotatably supported to the case 14 receiving the stator 10, a left end of the stator 10 is rotatably supported to a first support member 15 by a first bearing 16, and the right end of the stator 10 is rotatably supported to a second support member 17 by a second bearing 18. Further, a female threaded hole 19 is pierced through in the center of the rotor 13 along the longitudinal direction A—A. Further, a rod-shaped slider 20 is engaged with the female threaded hole 19 of the rotor 13, the right end of the slider 20 protrudes outward and a rotation of the slider 20 is inhibited by the following manner. An oval-shaped segmental circle portion 20A is provided near the right end of the slider 20, and this segmental circle portion 20A is arranged to and guided by an oval-shaped segmental circle hole 21B formed in a bottom portion 21A of a cup member 21 which is fixedly arranged in the right end of the case 14. The segmental circle portion 20A and the segmental circle hole 21A are disclosed in FIG. 3.

In accordance with the structure mentioned above, when a pulse signal for control is input to the exciting coil 11, the rotor 13 rotates one step angle by one step angle every one pulse input, and the rotor 13 rotates in correspondence to the input signal. Further, in accordance with the rotation of the rotor 13, since the rotation of the slider 20 is inhibited by the segmental circle portion 20A and the segmental circle hole 21B, the slider 20 moves linearly in the axial direction of the slider 20 in correspondence to the rotation of the rotor 13. On the other hand, a movement of the slider 20 to the right side in FIG. 2 is regulated by a right end portion 22A of a male screw 22 being brought into contact with the bottom portion 21A of the cup member 21.

In accordance with the conventional lead screw type stepping motor, since cross sectional shapes of the segmental circle portion 20A formed in the slider 20 and the segmental circle hole 21B formed in the cup member 21 are formed in an oval shape, it is hard to form a flat portion with an accurate symmetry level and an accurate shape precision, and there is a risk that non-reaction area is generated at a time when the rotor 13 rotates and reversely rotates. Particularly, in the case that this non-reaction area is great, there is a risk that a dicrepancy is generated between a number of pulse input to the stepping motor and a moving amount of the slider 20. In accordance with the structure mentioned above, it is impossible to provide a lead screw type stepping motor having a high response and controllability with respect to the input signal applied to the motor. Further, in FIG. 2, the regulation of the rightward movement of the slider 20 is achieved by bringing the right end portion 22A of the male screw 22 into contact with the bottom portion 21A of the cup member 21, however, in accordance with this structure, there is a risk that a regulated position is changed by a displacement of an assembled position at a time of assembling the cup member 21 in a right side plate 14A of the case 14, so that it is impossible to carry out an accurate initial alignment of the stepping motor.

SUMMARY OF THE INVENTION

The present invention is made by taking the problems mentioned above into consideration, and an object of the present invention is to provide a lead screw type stepping motor which is excellent in a response and a controllability with respect to an input signal applied to the motor, and can carry out an accurate initial alignment.

In accordance with the present invention, in order to achieve the object mentioned above, there is provided a lead screw type stepping motor structured such that a rotor is rotatably supported inside a stator around which an exciting coil is wound, a slider is arranged to be screwed with a female threaded hole provided through in a longitudinal direction of the rotor, and a rotation of the rotor is converted into a linear movement of the slider to be output, wherein a slit groove shaped in an oblong hole along the axial direction is pierced through in the slider, the slider is supported to a guide hole provided in a bearing portion of a case receiving the stator in such a manner as to freely move in the axial direction, a guide pin is arranged to be inserted into the slit groove, and both ends of the guide pin are press inserted and supported to the bearing portion.

When a pulse signal is input to the exciting coil and the rotor rotates, the slider which is inhibited by the slit groove and the guide pin from rotating, linearly moves in the axial direction of the slider. The slider rotation inhibiting means is achieved by the slit groove and the guide pin, and it is possible to maintain accuracy of manufacturing the slit groove and the guide pin, whereby it is possible to largely improve a response and a controllability of the slider with respect to the input signal applied to the motor. Further, since moving amount to one side and another side in the slider are regulated only by a length of the slit groove and the guide pin, it is particularly possible to accurately regulate the moving amount to one side and another side in the slider.

DESCRIPTION OF THE PREFERRED EMBODIMENT

Figure 1:
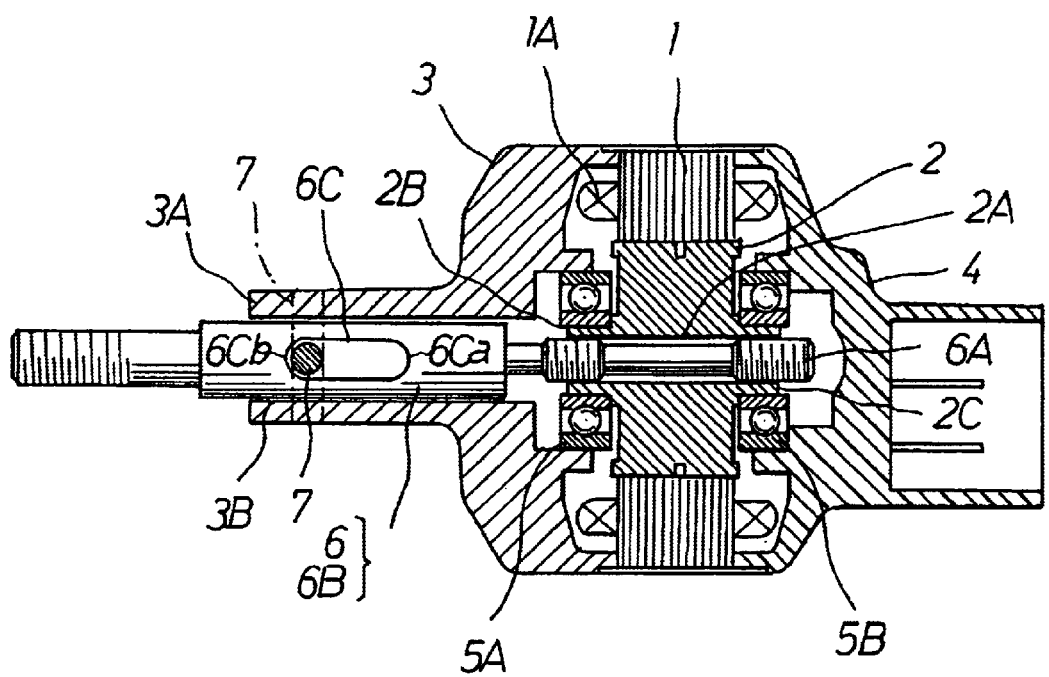
FIG. 1 is a vertical cross sectional side view showing one embodiment of a lead screw type stepping motor in accordance with the present invention.
Figure 2:
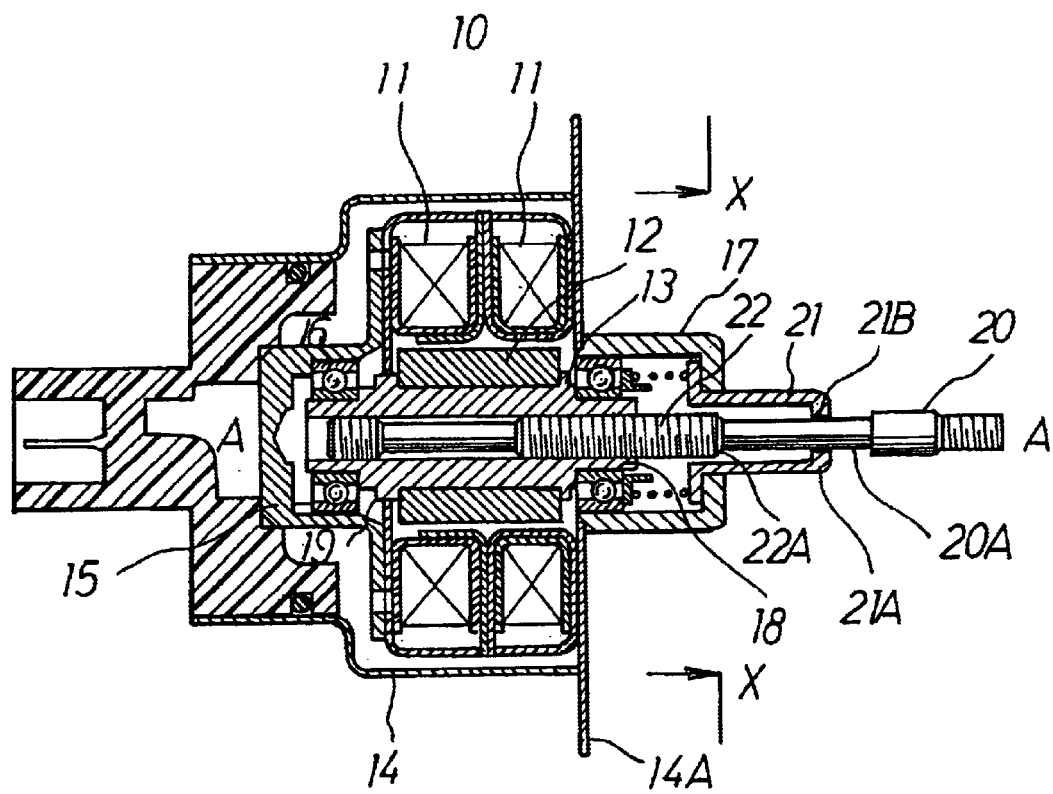
FIG. 2 is a vertical cross sectional side view showing a conventional lead screw type stepping motor.
Figure 3:
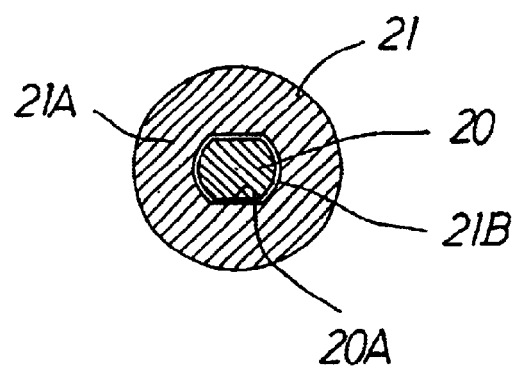
FIG. 3 is a vertical cross sectional side view along a line X—X in FIG. 2.

A description will be given below of one embodiment of a lead screw type stepping motor in accordance with the present invention with reference to FIG. 1. Reference numeral 1 denotes a stator around which an exciting coil 1A is wound. A rotor 2 is arranged inside the stator 1. A female threaded hole 2A is provided through in a center of the rotor 2 along a longitudinal direction, and the rotor 2 is rotatably supported in a manner mentioned below. That is, the rotor 2 arranged inside the stator 1 is received within a receiving space formed by a case 3 disposed in the left side and a case cover 4 disposed in the right side, a left shaft portion 2B of the rotor 2 is supported to the case 3 via a first bearing 5A, and a right shaft portion 2C of the rotor 2 is supported to the case cover 4 via a second bearing 5B, whereby the rotor 2 is rotatably borne to the inside of the stator 1.

A slider 6 converting the rotation of the rotor 2 into the linear movement is structured as follows. Reference symbol 6A denotes a male screw portion engaged with the female threaded hole 2A of the rotor 2. A shaft portion 6B having a circular cross section is provided so as to be connected outward from the left side of the male screw portion 6A. The male screw portion and the shaft portion 6B are concentrically shaped, a slit groove 6C formed in an oblong hole is pierced through in the shaft portion 6B, and the shaft portion 6B including the slit groove 6C is movably arranged in a guide hole 3B provided in a bearing portion 3A protruding leftward from the case 3. In this case, a left end portion 6D of the shaft portion 6B protrudes from the end of the bearing portion 3A further outward, and this left end 6D forms an output end of the slider 6.

Further, a guide pin 7 having a slightly smaller diameter than a groove width of the slit groove 6C is arranged to be inserted into the slit groove, and both ends of the guide pin 7 are press inserted to the bearing portion 3A and fixed. (A state in which the guide pin 7 is press inserted is shown by a single dot chain line.)

In accordance with the lead screw type stepping motor having the structure mentioned above, when a pulse signal for control is input to the exciting coil 1A, the rotor 2 rotates in correspondence to the input signal On the other hand, the slider 6 is structured such that the guide pin 7 is arranged to be inserted into the slit groove 6C, whereby the slider 6 is inhibited from rotating. Therefore, in accordance with the rotation of the rotor 2, the slider 6 linearly moves in the longitudinal direction in correspondence to the rotation. Then, the movement of the slider 6 to the left side is regulated by the right end 6 Ca of the slit groove 6C being brought into contact with the guide pin 7, and on the other hand, the movement of the slider 6 to the right side is regulated by the left end 6 Cb of the slit groove 6C being brought into contact with the guide pin 7.

In accordance with the lead screw type stepping motor on the basis of the present invention mentioned above, it is possible to introduce great improvement of a response and controllability with respect to the input signal applied to the motor. That is, the prevention of the rotational motion of the slider 6 and the linear movement of the slider 6 are achieved by the inner wall of the slit groove 6C and the guide pin 7, the slit groove 6C shaped in the oblong hole can be extremely easily and accurately formed by a milling machine process using a drill, and the guide pin 7 can be easily and accurately formed in accordance with a lathe turning machine process. In the manner mentioned above, since the shapes of the slit groove 6C and the guide pin 7 can be formed accurately, non-reaction area is not generated at a time when the rotor 2 is operated and reversed, and it is possible to inexpensively achieve the effect mentioned above.

Further, since an amount of reciprocation of the slider 6 and right and left movement stop positions are determined only by an axial length of the slit groove 6C and a diameter of the guide pin 7, and is not affected by the other components, it is particularly possible to carry out an accurate initial alignment of the stepping motor. Further, since the structure mentioned above employs the components which a stepping motor inherently has, and requires no new parts, a manufacturing cost is not increased. In this case, the structure of the stepping motor is not limited to the present embodiment.

As described above, in accordance with the lead screw type stepping motor on the basis of the present invention, since the slit groove shaped in the oblong hole along the axial direction is pierced through in the slider, the slider is supported to the guide hole provided in the bearing portion of the case receiving the stator in such a manner as to freely move in the axial direction, the guide pin is arranged to be inserted into the slit groove, and both ends of the guide pin are press inserted and supported to the bearing portion, non-reaction area is not generated at a time when the rotor is operated and reversed, and it is possible to achieve great improvement of the response and the controllability with respect to the input signal to the motor. Further, it is possible to accurately regulate the maximum and minimum stroke positions of the stepping motor by a single slit groove, whereby it is possible to carry out an accurate initial alignment of the stepping motor.

What is claimed is:

1. A lead screw type stepping motor structured such that a rotor is rotatably supported inside a stator around which an exciting coil is wound, a slider is arranged to be screwed with a female threaded hole provided through in the longitudinal direction of said rotor, and a rotation of the rotor is converted into a linear movement of the slider to be output, wherein a slit groove (6C) shaped in an oblong hole along the axial direction is pierced through in said slider, the slider (6) is supported to a guide hole (3B) provided in a bearing portion (3A) of a case (3) receiving the stator (1) in such a manner as to freely move in the axial direction, a guide pin (7) is arranged to be inserted into the slit groove, and both ends of the guide pin (7) are press inserted and supported to the bearing portion.

* * * * *